(12) United States Patent
Araki

(10) Patent No.: US 6,609,875 B1
(45) Date of Patent: Aug. 26, 2003

(54) PLATE MATERIAL CARRYING APPARATUS

(76) Inventor: Yuji Araki, 743-1, Sanda, Atsugi-shi, Kanagawa 243-0211 (JP)

( * ) Notice: Subject to any disclaimer, the term of this patent is extended or adjusted under 35 U.S.C. 154(b) by 136 days.

(21) Appl. No.: 09/691,161

(22) Filed: Oct. 19, 2000

Related U.S. Application Data

(62) Division of application No. 09/194,760, filed on Dec. 3, 1998, now Pat. No. 6,152,682.

(30) Foreign Application Priority Data

| Mar. 24, 1997 | (JP) | ................................................. 9-69663 |
| Apr. 18, 1997 | (JP) | ............................................. 9-101622 |

(51) Int. Cl.$^7$ ............................................... B65G 59/02
(52) U.S. Cl. ................................ 414/796.5; 414/796.8; 414/929; 414/225
(58) Field of Search ........................... 414/793.5, 789.9, 414/790.4, 796.8, 792.8, 794.7, 788.4, 792.9, 933, 927, 928, 222.01, 222.07, 225, 286, 786, 796.9

(56) References Cited

U.S. PATENT DOCUMENTS

| 3,894,638 | A | * | 7/1975 | Hovekamp | ............... 214/6 DK |
| 5,096,367 | A | | 3/1992 | Winski | |
| 5,120,178 | A | * | 6/1992 | Ito | ............... 414/225 |
| 5,232,331 | A | * | 8/1993 | Kasai et al. | ............... 414/786 |
| 5,244,343 | A | * | 9/1993 | Lockert | ............... 414/797 |
| 5,347,898 | A | * | 9/1994 | Ito | ............... 83/27 |
| 5,354,169 | A | * | 10/1994 | Washio et al. | ........... 414/745.7 |
| 5,358,375 | A | | 10/1994 | Kawada et al. | |
| 5,451,132 | A | * | 9/1995 | Tokiwa | ............... 414/225 |
| 5,490,752 | A | | 2/1996 | Tokiwa et al. | |
| 5,810,487 | A | | 9/1998 | Kano et al. | |
| 5,895,200 | A | | 4/1999 | Sato | |
| 5,941,673 | A | * | 8/1999 | Hayakawa et al. | ......... 414/416 |
| 6,152,682 | A | * | 11/2000 | Araki | ............... 414/796.5 |

FOREIGN PATENT DOCUMENTS

| EP | 0574307 A2 | 9/1993 |
| EP | 0 574 307 A2 | 12/1993 |
| JP | 60247422 | 4/1984 |
| JP | 60-247422 | 7/1985 |
| SU | 1337233 | 9/1987 |

* cited by examiner

*Primary Examiner*—Joseph A. Fischetti

(57) ABSTRACT

A material table 39 supporting materials W is provided so as to be able to move between a plate material taking-in/out area 11 and material wait area 13, and when the material table 39 is positioned in the plate material taking-in/out area 11, the material table 39 is positioned in a lower position adjacent to an upper end portion of a slat conveyor 33.

2 Claims, 14 Drawing Sheets

PLATE MATERIAL CARRYING APPARATUS

This is a division of application Ser. No. 09/194,760 filed Dec. 3, 1998 now U.S. Pat. No. 6,152,682.

BACKGROUND OF THE INVENTION

1. Field of the Invention

The present invention relates to a plate material carrying apparatus for carrying materials stored on a material pallet one by one into a plate material processing machine such as a laser processing machine and punching press, and for carrying out products one by one of a plate material processing machine onto a product pallet.

2. Description of the Related Art

The description is given as to a conventional plate material carrying apparatus.

A mount frame is provided to the vicinity of a plate material processing machine, a plate material taking-in/out area is provided in the mount frame, and a material wait area and a product wait area are provided respectively to one side and the other side of the plate material taking-in/out area. A first pallet supporting member supporting a product pallet or a material pallet is provided in the plate material taking-in/out area, a second pallet supporting member supporting the material pallet is provided to the material wait area, and a third pallet supporting member supporting the product pallet is provided to the product wait area. A pallet taking-in/out unit is provided to the third pallet supporting member, and this pallet taking-in/out unit sends out the product pallet to the first pallet supporting member and takes in the product pallet from the first pallet supporting member.

A lifter table, which has a lift stand which supports the material pallet or product pallet and which can rise and lower, is provided, and this lifter table can move between the plate material taking-in/out area and material wait area.

A slat conveyor is provided to a suitable position of the mount frame so as to cover a circumference of the plate material taking-in/out area, and this slat conveyor has a plurality of supporting rollers which are rotatable in a suitable extent. The slat conveyor is constituted so as to be able to be switched between a blockade state that an upper part of the plate material taking-in/out area is blockaded and an open state that the upper part of the plate material taking-in/out area is opened.

A guide rail which is extended in the carrying direction is provided at a suitable position of the mount frame, and the guide rail is provided with a slider which can move to the carrying direction between a position above the plate material processing machine and a position above the slat conveyor. The slider is provided with a vacuum pad which adsorbs an upper surface of a material and can lift and lower, and the slider is further provided with a product damper clamping an end portion of a product.

Therefore, after amaterial is plate-material-processed, an end portion of the product is clamped by the product clamper, and the slider is moved from the position above the plate material processing machine to the position above the slat conveyor. As a result, the product can be supported by a plurality of the supporting rollers of the slat conveyor in the blockade state. At this time, the material pallet is supported by the second pallet supporting member, and the product pallet is supported by the lift stand on the lifter table in the plate material taking-in/out area. When the slat conveyor is switched from the blockade state to the open state, the products are stored on the product pallet.

After the products are stored on the product pallet, the lift stand on the lifter table is lowered so that the product pallet is received by the first pallet supporting member. Next, the product pallet is drawn out of the first pallet supporting member to the third pallet supporting member by the pallet taking-in/out unit, and the lifter table is moved from the plate. material taking-in/out area to the material wait area. Then, the lift stand is raised so as to receive the material pallet from the second pallet supporting member, and the lifter table is moved from the material wait area to the plate material taking-in/out area.

After the lifter table is moved to the plate material taking-in/out area, the lift stand is raised, and a topmost material on the material pallet is positioned in a lower position adjacent to the upper end portion of the slat conveyor. Next, a plurality of vacuum pads are lowered, and the upper surface of the material is adsorbed by a plurality of the vacuum pads. A plurality of the vacuum pads are raised so as to lift the material, and the slat conveyor is switched from the open state to the blockade state. As a result, one of the materials is taken out so as to be able to be supported by a plurality of the supporting rollers of the slat conveyor.

After the material is supported by a plurality of the supporting rollers of the slat conveyor, the slider is moved from the position above the slat conveyor to the position above the plate material processing machine with the material being adsorbed by a plurality of the vacuum pads. As a result, the materials can be carried into the plate material processing machine, and the plate material processing can be performed by the plate material processing machine.

As mentioned above, in the conventional plate material carrying apparatus, after the plate material processing is performed and products are stored on the product pallet, one of the materials is taken out to be supported by a plurality of the supporting rollers of the slat conveyor. For this reason, it is necessary that the material pallet is moved from the plate material taking-in/out area to the product wait area and that the material pallet is moved from the material wait area to the plate material taking-in/out area by the lifter table, and thus there arises a problem such that the operation requires a lot of time and the efficiency of the operation is decreased.

SUMMARY OF THE INVENTION

It is an object of the present invention to provide a plate material carrying apparatus for plate material processing machine which is capable of exchanging a material pallet and product pallet efficiently with a simple mechanism, shortening a pallet replacing time, improving the productivity of the plate material processing machine and being reasonable.

In order to accomplish the object described above, from the first aspect, the present invention provides a plate material carrying apparatus for carrying materials stored on a material pallet one by one into a plate material processing machine and for carrying products from the plate material processing machine one by one onto a product pallet, comprising:

a mount frame provided to the vicinity of the plate material processing machine;

a plate material taking-in/out area provided in the mount frame;

a material wait area and product wait area provided to one side and the other side of the plate material taking-in/ out area;

a first pallet supporting member supporting the product pallet or material pallet in the plate material taking-in/ out area;

a second pallet supporting member supporting the material pallet in the material wait area;

a third pallet supporting member supporting the product pallet in the product wait area;

a pallet taking-in/out unit sending the product pallet to the first pallet supporting member and taking in the product pallet from the first pallet supporting member;

a lifter table having a lift stand to be able to lift and lower which supports the material pallet or product pallet, the lifter table being provided so as to be able to move between the plate material taking-in/out area and the material wait area;

a slat conveyor having a plurality of rotatable supporting rollers in a suitable extent, the slat conveyor being provided so as to cover a circumference of the plate material taking-in area, the slat conveyor being constituted so as to be able to be switched between a blockade state that an upper part of the plate material taking-in/out area is blockaded by the plurality of supporting rollers and an open state that the upper part of the plate material taking-in/out area is opened;

a material table supporting materials, the material table being provided so as to be able to move between the plate material taking-in/out area and the material wait area; and a slider provided between a position above the plate material processing machine and a position above the slat conveyor so as to be able to move to a carrying direction, the slider having a plurality of vacuum pads which adsorb upper surfaces of the materials and can lift and lower and having product dampers clamping an end portions of the products.

In addition, the plate material carrying apparatus may be constituted such that the mount frame has a plurality of storing sections in up-and-down direction for storing the material pallet and product pallet, the third pallet supporting member is an elevator provided to the other side of the mount frame so as to be able to lift and lower, the elevator is composed so as to be able to support the product pallet or material pallet in the product wait area, the pallet taking-in/out unit is constituted so as to be able to send the product pallet and material pallet to the first pallet supporting member and a suitable storing section and take in the product pallet and material pallet from the first pallet supporting member and the suitable storing section.

According to the above constitution, after the plate material processing is performed on the materials, the end portion of the material is clamped by the product clampers, and the slider is moved from the position above the plate material processing machine to the position above the slat conveyor. As a result, the product can be supported by a plurality of the supporting rollers of the slat convertor in the blockade state. At this time, the material pallet is supported to the second pallet supporting member, and the product pallet is supported to the lift stand on the lifter table in the plate material taking-in/out area, and the material table is positioned in the material wait area. When the slat conveyor is switched from the blockade state to the open state, the products can be stored on the product pallet.

After the products are stored on the product pallet, the lift stand on the lifter table is lowered to send the product pallet to the first pallet supporting member, and the material table is moved from the product wait area to the plate material taking-in/out area. As a result, as mentioned later, one material which is taken out from the materials during the plate material processing and is supported to the material table can be positioned in the lower position adjacent to the upper end portion of the slat conveyor. Next, a plurality of the vacuum pads are lowered so as to adsorb the upper surface of the material. A plurality of the vacuum pads are raised to lift the material, and the slat conveyor is switched from the blockade state to the open state. As a result, the material can be supported by a plurality of the supporting rollers in the slat conveyor.

After the material is supported by a plurality of the supporting rollers in the slat conveyor, the slider is moved from the position above the slat conveyor to the position above the plate material processing machine with the material being adsorbed by a plurality of the vacuum pads. As a result, the material can be carried into the plate material processing machine, and the plate material processing can be performed by the plate material processing machine.

During the plate material processing, as mentioned below, one of the materials is taken out and is supported to the material table.

Namely, the product pallet is taken from the first pallet supporting member into the third pallet supporting member by the pallet taking-in/out unit. Moreover, the lifter table is moved from the plate material taking-in/out area to the material wait area. Then, the lift stand is raised to receive the material pallet from the second pallet supporting member, and the lifter table is moved from the material wait area to the plate material taking-in/out area.

After the lifter table is moved to the plate material taking-in/out area, the lift table is raised and the topmost material on the material pallet is positioned in the lower position adjacent to the upper end portion of the slat conveyor. Next, the slider is positioned in the position above the slat conveyor, and a plurality of the vacuum pads are lowered to adsorb the upper surface of the material. Then, a plurality of the vacuum pads are raised to lift the material, and the slat conveyor is switched from the open state to the blockade state. As a result, one of the materials can be taken out and supported by a plurality of the supporting rollers in the slat conveyor.

After the material is supported by a plurality of the supporting rollers in the slat conveyor, the lift stand on the lifter table is lowered to send the material pallet to the first pallet supporting member, and the material table is moved from the product wait area to the plate material taking-in/out area. When the slat conveyor is switched from the blockade state to the open state, one of the materials is supported to the material table.

After the material is supported to the material table, the material table and lifter table are positioned from the plate material taking-in/out area to the material wait area. Moreover, the slat conveyor is switched from the open state to the blockade state. Then, the product pallet is sent by the pallet taking-in/out unit from the third pallet supporting member to the first pallet supporting member.

In addition, according to the above constitution, besides the functions mentioned above, in the case where a prescribed number of products are stored on the product pallet, the product pallet is taken out by the pallet taking-in/out unit from the first pallet supporting member, and the elevator is raised to be positioned in a position whose level corresponds to s suitable storing section. Then, the product is sent to the suitable storing section by the pallet taking-in/out unit, and the elevator is lowered to be positioned in a position whose level corresponds to the first pallet supporting member.

In the case where the material pallet is emptied, as mentioned above, after the product pallet is sent to a suitable storing section and the elevator is positioned in a position whose level corresponds to the first pallet supporting member, the emptied pallet is taken out from the first pallet supporting member to the elevator by the pallet taking-out unit, and the elevator is raised to be positioned in a position whose level corresponds to a suitable emptied storing section. Then, the emptied pallet is sent to the suitable emptied storing section by the pallet taking-out unit, and the elevator is lowered to be positioned in a position whose level corresponds to the first pallet supporting member.

From the second aspect, the present invention provides a work carrying-in/out apparatus for carrying works into/out from a plate material processing machine which processes plate-shaped works, comprising:

a moving lifter unit moving a material pallet or product pallet up and down in a carrying-in/out station so as to carry the works into the plate material processing machine and carry out products processed by the plate material processing machine from the plate material processing machine, the moving lifter unit being provided so as to freely move to a first wait station provided to one side of the carrying-in/out station so as to have the material pallet or product pallet waiting and supports them;

a second wait station provided to the other side of the carrying-in/out station; and a work carrying-in/out transport unit separating the works on the material pallet in the carrying-in/out station one by one so as to carry them into the plate material processing machine and for carrying products processed by the plate material processing machine to the product pallet positioned in the carrying-in/out station.

In addition, in the above constitution, the apparatus may be constituted such that a plurality of pallet storing shelves are provided to the carrying-in/out station so as to form plural up-and-down steps, an elevator unit which can freely move up and down and which transports the product pallet or material pallet from the pallet storing shelves to the carrying-in/out station, and the elevator unit is used as a second wait station.

In this constitution, after the material pallet is drawn out from a desired pallet storing shelf to the elevator unit, the elevator unit is lowered to the second wait station, and the material pallet is sent to the carrying-in/out station. The material pallet in the carrying-in/out station is raised by the moving lifter unit, and one work is separated by the work carrying-in/out transport unit from a plurality of works stored on the material pallet so as to be carried into the plate material processing machine.

While the work is being processed by the plate material processing machine, the material pallet in the carrying-in/ out station is moved by the moving lifter unit to the first wait station and waits there. Meanwhile, after the elevator unit is raised again and the emptied pallet is drawn out of the desired pallet storing section of the work storage unit to the elevator unit, the elevator unit is lowered to the second wait station, and the emptied pallet is sent out to the carrying-in/out station as the product pallet for storing product thereon.

The products processed by the plate material processing machine are carried out to the carrying-in/out station by the work carrying-in/out transport unit, and the products are stored on the product pallet. The product pallet is pulled back to the second wait station of the elevator unit again and the material pallet waiting in the first wait station is moved to the carrying-in/out station by the moving lifter unit. The material pallet in the carrying-in/out station is raised by the moving lifter unit, and one work is separated from a plurality of works stored on the material pallet by the work carrying-in/out transport unit and is carried into the plate material processing machine so as to be processed therein. The above steps are repeated.

Since the moving lifter unit is raised and lowered and freely moves between the carrying-in/out station and the first wait station, the material pallet and product pallet are exchanged efficiently with a simple mechanism and the pallet exchanging time is shortened, so the productivity of the plate material processing machine is improved.

In addition, the above constitution may be provided with a pallet supporting unit for temporarily supporting the material pallet or product pallet in the carrying-in/out station and first wait station.

Therefore, the moving lifter unit is operated efficiently. For example, the material pallet in the carrying-in/out station is moved to the first wait station by the moving lifter unit, and after the material pallet is placed on the pallet supporting unit in the first wait station and the products are stored on the product pallet sent from the second wait station to the carrying-in/out station, the material pallet in the first wait station is moved to the carrying-in/out station by the moving lifter unit so as to be raised in the carrying-in/out station, and one work is separated from a plurality of works stored on the material pallet by the work carrying-in/out transport unit.

DETAILED DESCRIPTION OF THE PREFERRED EMBODIMENTS (First Embodiment)

The following describes the first embodiment of the present invention on reference to the drawings.

Figure 1:
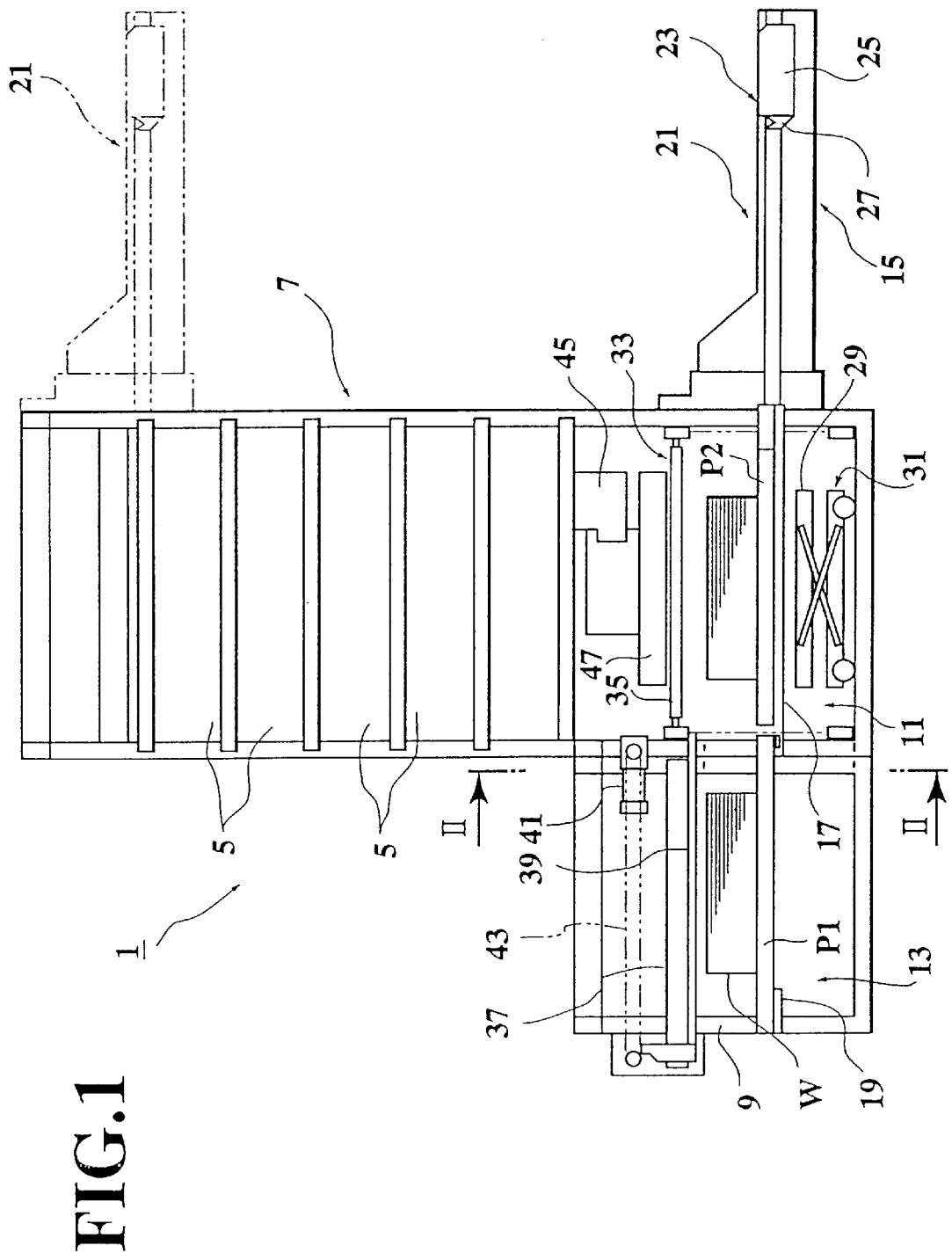
FIG. 1 is a drawing showing first embodiment of a plate material carrying apparatus of the present invention.
Figure 2:
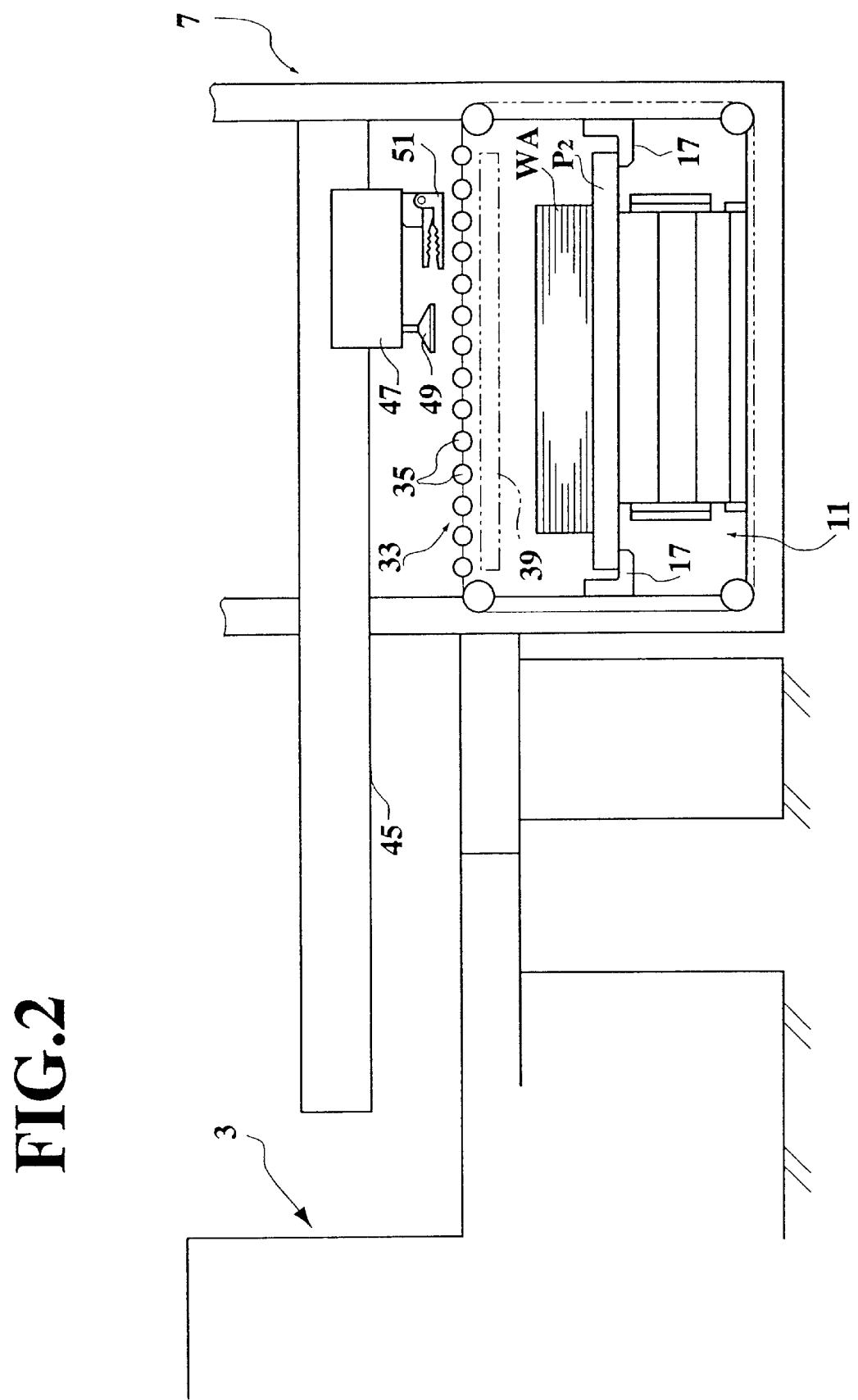
FIG. 2 is a drawing taken along line II—II of FIG. 1.

On reference with FIGS. 1 and 2, a plate material carrying apparatus 1 according to the first embodiment of the present invention carries materials W stored on a material pallet P1 into a plate material processing machine 3 one by one and carries products WA from the plate material processing machine 3 to a product pallet P2 one by one. The following details the plate material carrying apparatus 1.

A mount frame 7, which has a plurality of storing sections 5 for storing the material pallet P1 or product pallet P2 in up and down positions of the mount frame 7 (up and down in FIGS. 1 and 2), is provided at the vicinity of the right side of the plate material processing machine 3 (the front side of the sheet of FIG. 1, and the right side in FIG. 2) with the mount frame 7 in a stand pose, and a supporting frame 9 is provided integrally to the front side of the mount frame 7 (the left side in FIG. 1, and front side of the sheet of FIG. 2). A plate material taking-in/out area 11 is provided to the lower side of the lowest storing section 5 in the mount frame 7, and a material wait area 13 and product wait area 15 are provided respectively to the front side and rear side of the plate material taking-in/out area 11. A pair of guide rails 17 are provided to the lower side of the lowest storing section 5 in the mount frame 7 with them being separated right and left from each other, and the pair of guide rails 17 support the product pallet P2 or material pallet P1 in the plate material taking-in/out area 11. A pair of pallet supporting members 19 are provided to in a suitable front position of the supporting frame 9 with them being separated right and left from each other, the front portion of the pair of pallet supporting members 19 and the pair of guide rails 17 support the material pallet P1 in the material wait area 13.

An elevator 21 is provided to the rear side of the mount frame 7 so that it can lift and lower through driving of a lift/lowering motor (not shown), and this elevator 21 supports the product pallet P2 or material pallet P1 in a product wait area 15. A pallet taking-in/out unit 23 is provided to the elevator 21. This pallet taking-in/out unit 23 sends the product pallet P2 or material pallet P1 to the pair of guide rails 17 and the suitable storing section 5, and takes in the product pallet P2 and material pallet P1 from the pair of guide rails 17 and suitable storing section 5. The pallet taking-in/out unit 23 includes a traverser 25 which is provided to the elevator 21 so as to be movable to a back-and-forth direction, and an engaging section 27 which is provided with the traverser 25 and can engage with portions to be engaged of the pallets P1 and P2.

A lifter table 31, which can lift and lower a lift stand 29 for supporting the material pallet PI, is provided, and this lifter table 31 can move in the back-and-forth direction between the plate material taking-in/out area 11 and material wait area 13. A slat conveyor or shutter 33 is provided to the lower side of the lowest storing section 5 in the mount frame 7 so as to cover the circumference of the plate material taking-in/out area 11, and this slat conveyor 33 includes a plurality of supporting rollers 35, which can rotate to the right-and-left direction (carrying direction), in a suitable extent. The slat conveyor 33 is composed so as to be able to be switched between a blockade state wherein a plurality of the supporting rollers 35 blockade an upper part of the plate material taking-in/out area 11 and an open state that the upper part of the plate material taking-in/out area 11 is opened.

A pair of table guides 37 which are extended to the back-and-forth direction are provided to a suitable position of the supporting frame 5, and a material table 39 for supporting the materials W is provided to the table guide 37 so as to be movable in the back-and-forth direction between the plate material taking-in/out area 11 and the material wait area 13. An endless-type traveling chain 43 which can travel to the back-and-forth direction by means of driving of a driving motor 41 is provided to the supporting frame 5 so as to move the material table 39 in the back-and-forth direction, and the material table 39 is connected with a suitable position of the traveling chain 43. Here, the material table 39 is constituted such that when the material table 39 is positioned in the plate material taking-in/out area 11, it is positioned in a lower position adjacent to an upper end portion of the slat conveyor 33.

A guide member 45 which is extended in the right-and-left direction is provided to the mount frame 7, and a slider 47 is provided to the guide member 45 so as in movable to the right-and-left direction (carrying direction) between the position above the punching press 3 and the position above the slat conveyor 33. A plurality of vacuum pads 49 which adsorb upper surfaces of the materials W are provided to the slider 47, and the plurality of vacuum pads 49 can lift and lower by means of actuation of a lift/lowering cylinder (not shown) with respect to the slider 47. Further, a plurality of product clampers 51 for clamping end portions of the products WA are provided to the slider 47.

The following describes the function of the embodiments of the present invention.

Figure 3:
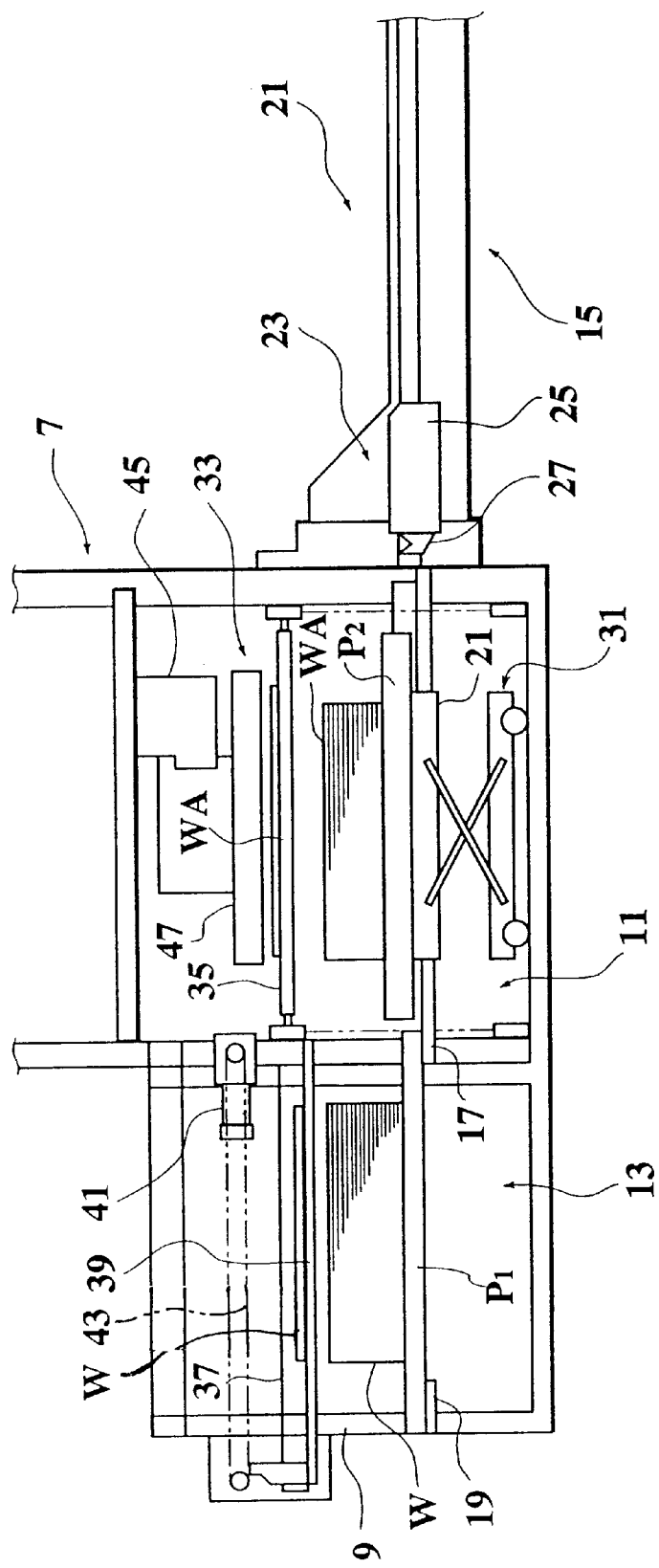
FIG. 3 is a function explanatory drawing of the first embodiment.

After plate material processing is performed on the materials W by the plate material processing machine 3 so that the products WA are formed, the end portions of the products WA are clamped by a plurality of the product dampers 51, and the slider 47 is moved from the position above the plate material processing machine 3 to the position above the slat conveyor 33. As a result, the products WA can be supported on a plurality of the supporting rollers 35 on the slat conveyor 33 which is blockaded. At this time, the material pallet P1 is supported on the pallet supporting member 19 and the front portion of the guide rails 17, and the product pallet P2 is supported on the lift stand 29 on the lifter table 31 in the plate material taking-in/out area 11, and the material table 39 is positioned in the material wait area 13 (see FIG. 3). When the slat conveyor 33 is switched from the blockade state to the open state, the products WA are stored on the product pallet P2.

Figure 4:
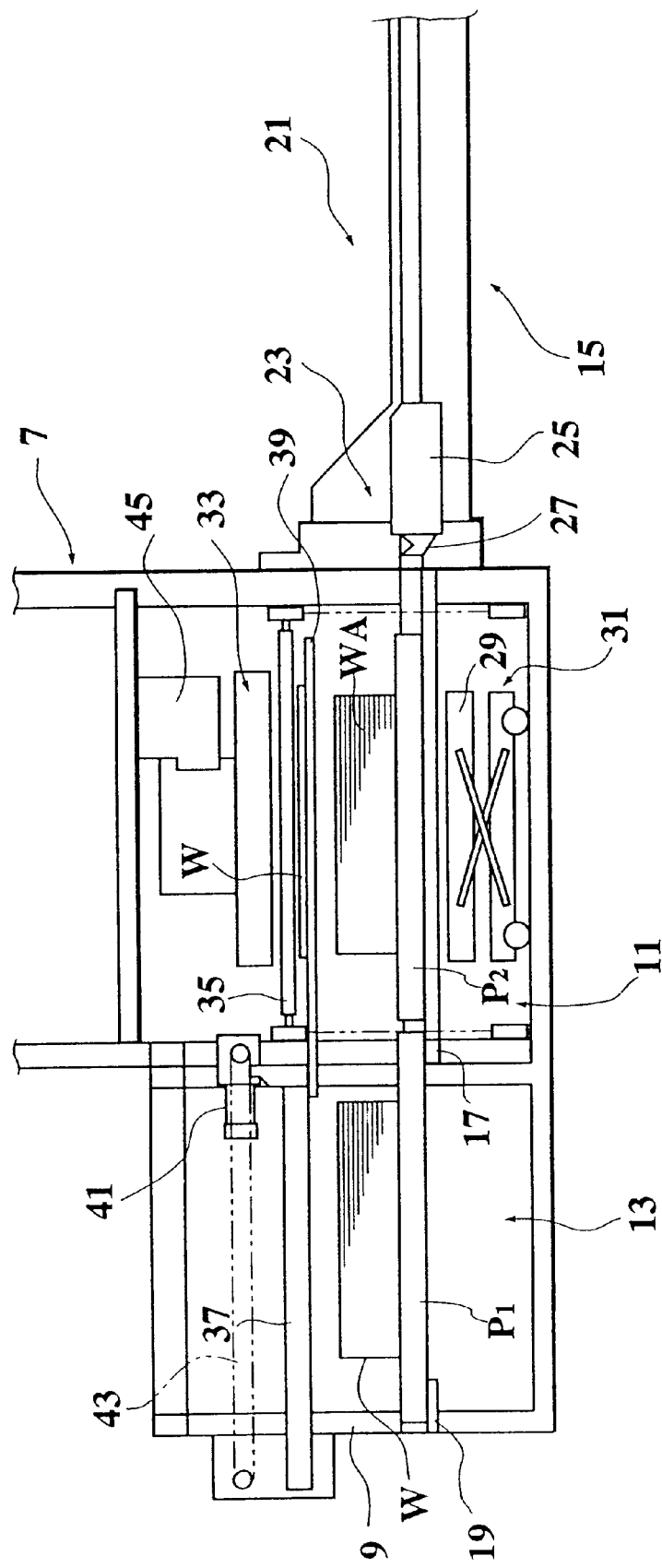
FIG. 4 is a function explanatory drawing of the first embodiment.
Figure 7:
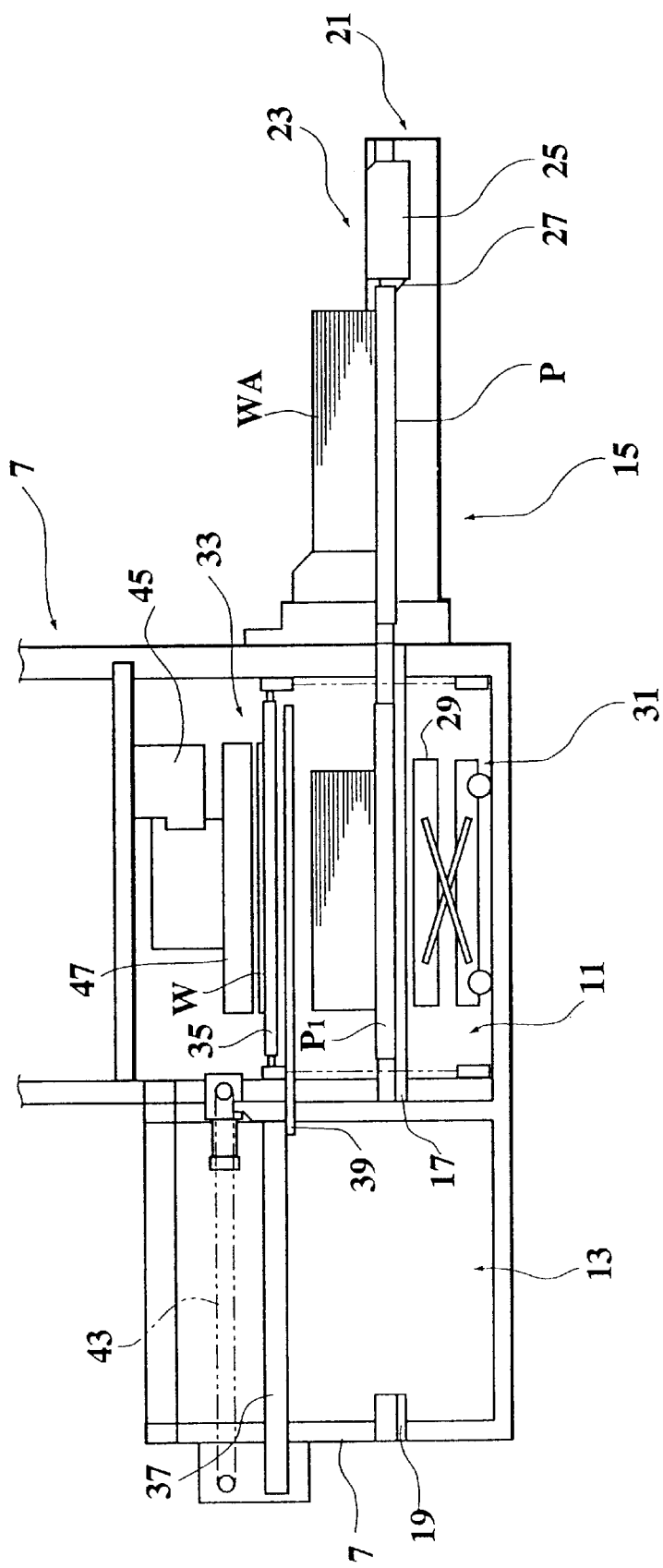
FIG. 7 is a function explanatory drawing of the first embodiment.

After the products WA are stored on the product pallet P2, the lift stand 29 on the lifter table 31 is lowered so that the product pallet P2 is sent to the guide rails 17, and the material table 39 is moved by the driving of the driving motor 41 from the product wait area 13-to the plate material taking-in/out area 11 (see FIG. 4). In that position, as will be described with respect to the discussion on FIG. 7 below, one of the materials W, which has been taken out and supported on the material table 39 during the plate material processing, can be positioned to the lower position adjacent to the upper end portion of the slat conveyor 33 in the plate material taking-in/out area 11. Next, a plurality of the vacuum pads 49 are lowered and the upper surface of the material W is adsorbed by a plurality of the vacuum pads 49. Then, a plurality of the vacuum pads 49 are raised to lift the material W, and the slat conveyor 33 is switched from the open state to the blockade state. As a result, the material W can be supported on a plurality of the supporting rollers 35 on the slat conveyor 33.

After the material W is supported on a plurality of the supporting rollers 35 on the slat conveyor 33, the slider 47 is moved from the position above of the slat conveyor 33 to the position above the plate material processing machine 3 with the material W being adsorbed by a plurality of the vacuum pads 49. As a result, the material W can be carried into the plate material processing machine 3, and thus the plate material processing can be performed on the materials W by the plate material processing machine 3.

While the plate material processing is performed on the materials W, one of the materials W is taken out to be supported on the material table 39 as will be described later.

Figure 5:
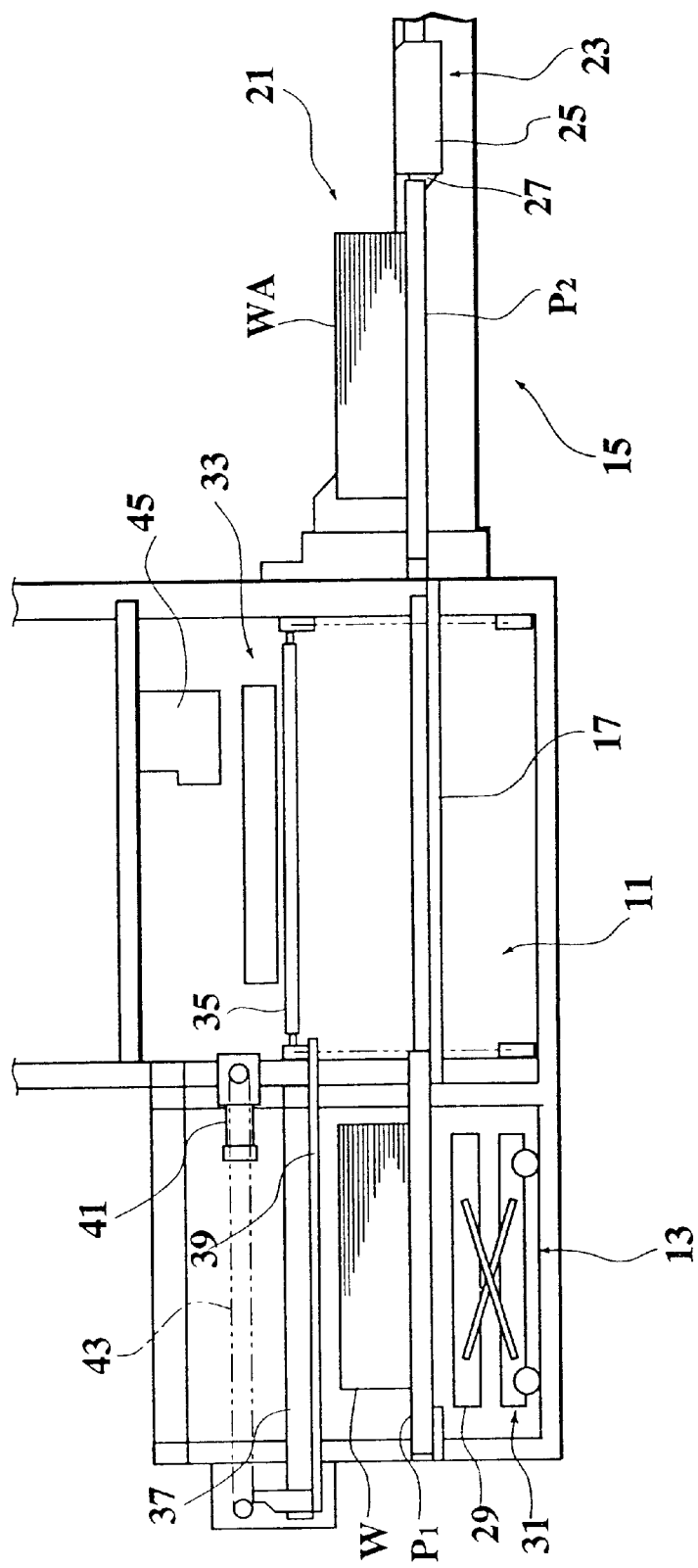
FIG. 5 is a function explanatory drawing of the first embodiment.

Namely, the product pallet P2 is drawn out by the pallet taking-in/out unit 23 from the guide rails 17 to the elevator 21. Moreover, the lifter table 31 is moved from the plate material taking-in/out area 11 to the product wait area 13. The lift stand 29 is raised to receive the material pallet P1 from pallet supporting members 19 and the forward portions of the guide rails 17, and the lifter table 31 is moved from the material wait area 13 to the plate material taking-in/out area 11 (see FIG. 5).

Figure 6:
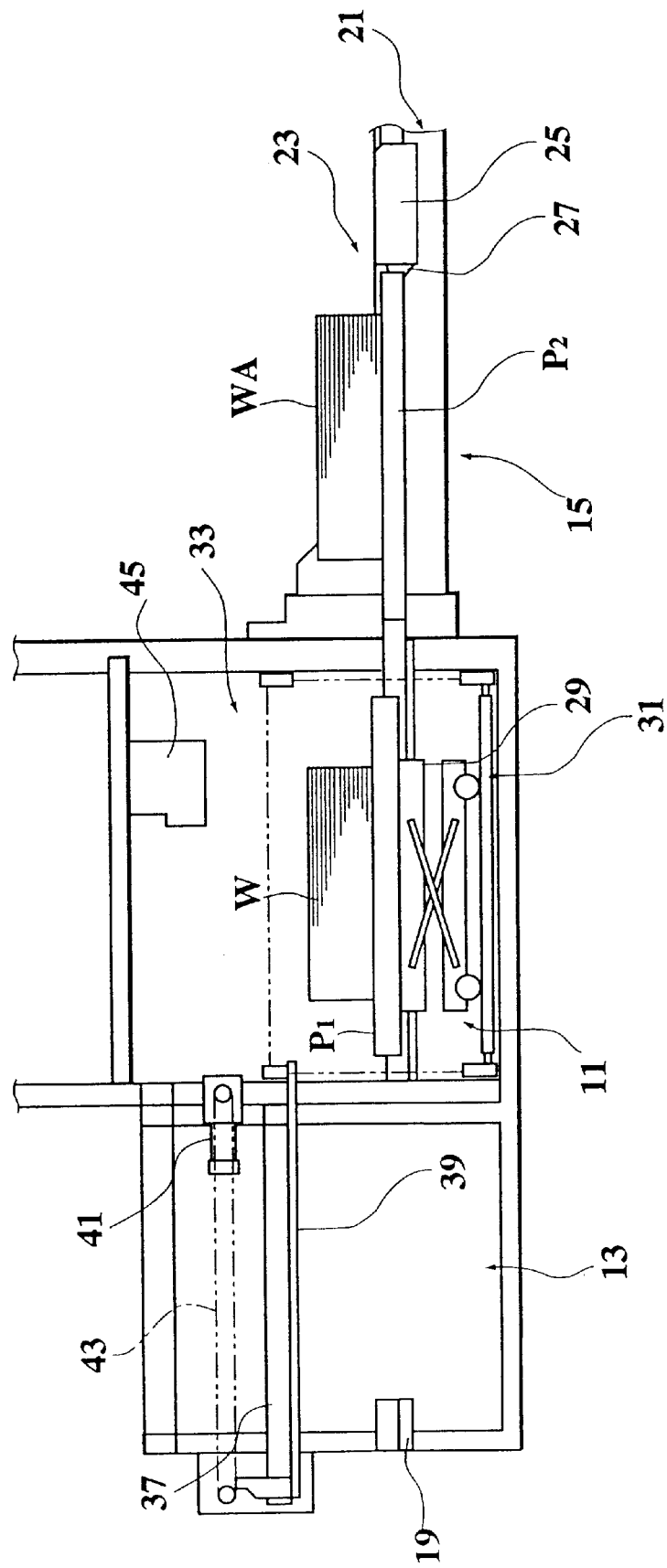
FIG. 6 is a function explanatory drawing of the first embodiment.

After the lifter table 31 is moved to the plate material taking-in/out area 11, the lift stand 29 is raised so that the topmost material W on the material pallet P1 is positioned in the lower position adjacent to the upper end portion of the slat conveyor 33 (see FIG. 6). Next, the slider 47 is positioned in the upper position of the lifter table 31 to lower a plurality of the vacuum pads 49, and the upper surface of the material W is adsorbed by a plurality of the vacuum pads 49. Then, a plurality of the vacuum pads 49 are raised to lift the material W, and the slat conveyor 33 is switched from the open state to the blockade state. As a result, one of the material W is taken out to be able to be supported to a plurality of the supporting rollers 35 on the slat conveyor 33 (see FIG. 7).

After the material W is supported on a plurality of the supporting rollers 35 on the slat conveyor 33, the lift stand 29 on the lifter table 31 is lowered to send the material pallet P1 to the guide rails 17, and the material table 39 is moved from the material wait area 13 to the plate material taking-in/out area 11 by the driving of the driving motor 41. When the slat conveyor 33 is switched from the blockade state to the open state, one of the materials W taken out can be supported on the material table 39.

Figure 8:
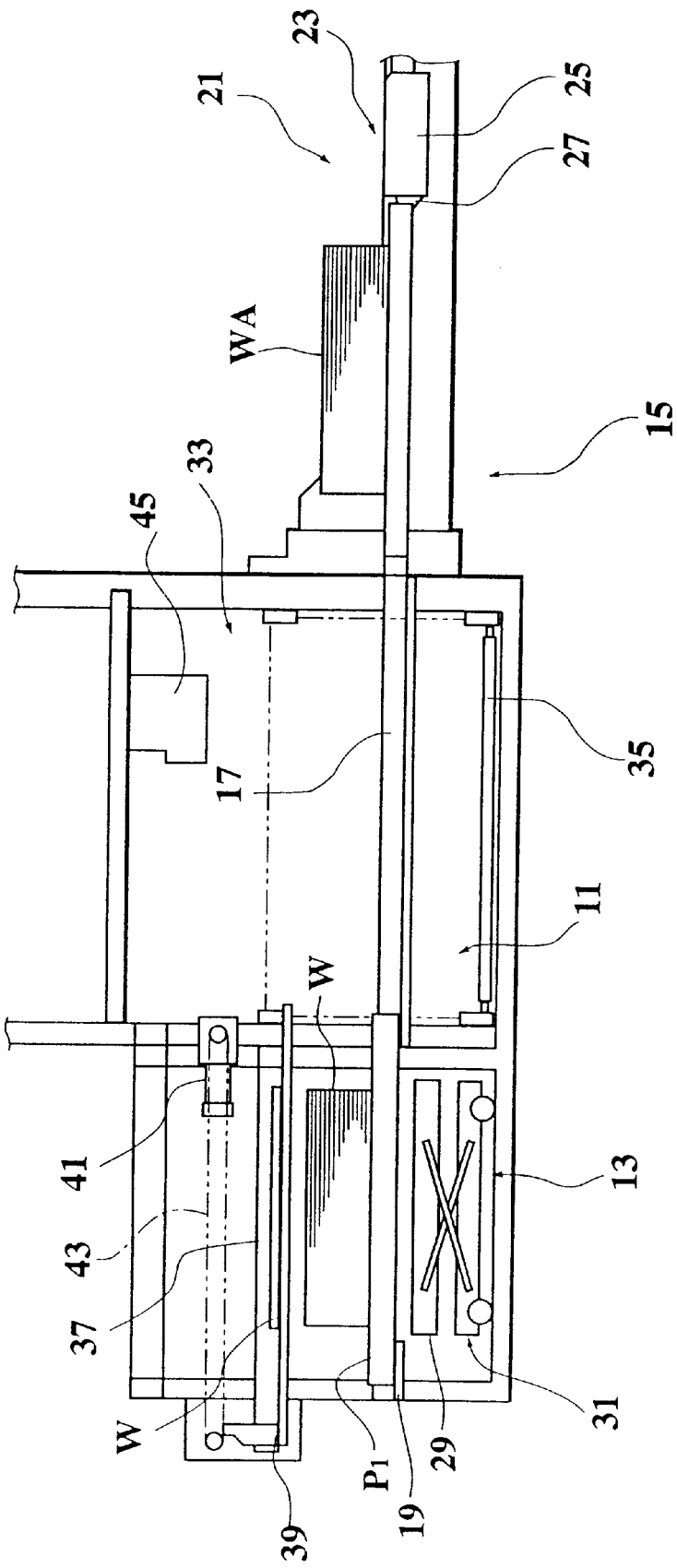
FIG. 8 is a function explanatory drawing of the first embodiment.
Figure 9:
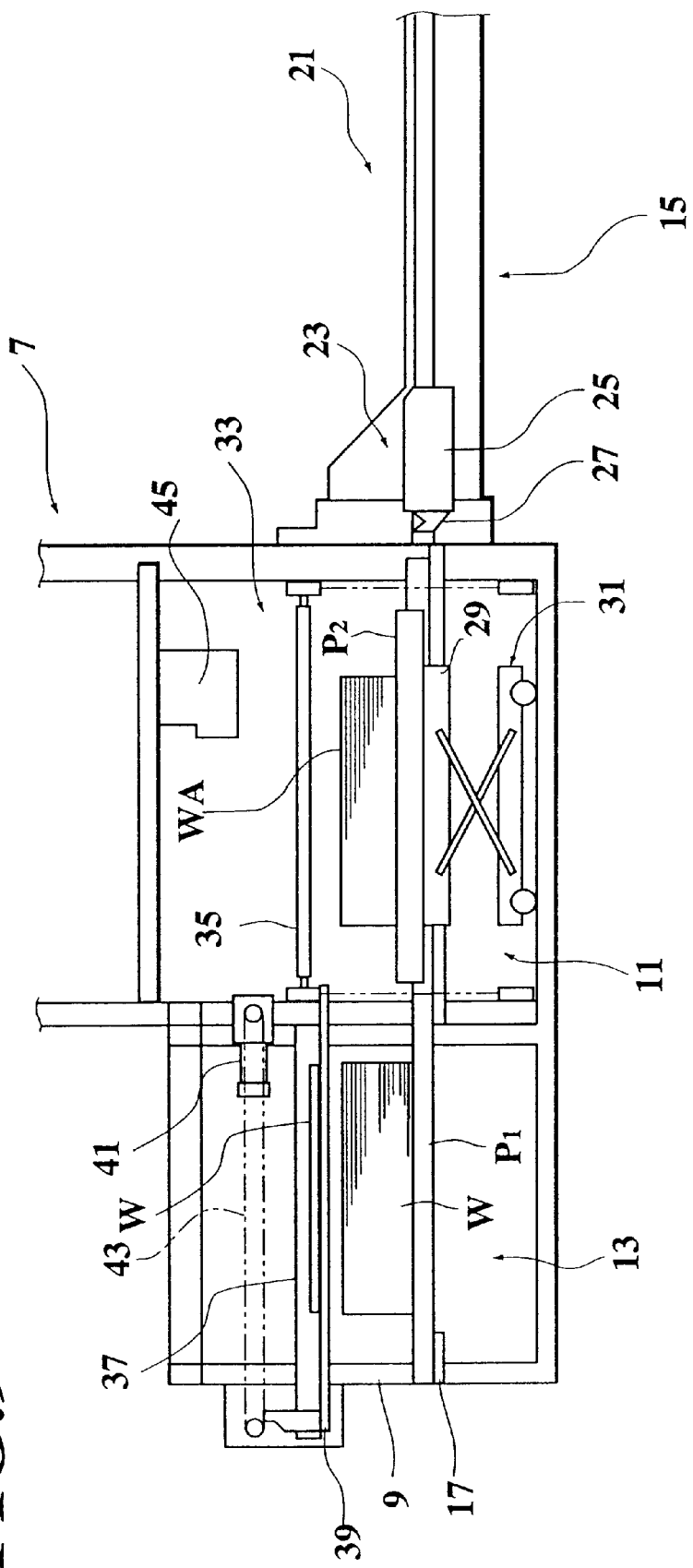
FIG. 9 is a function explanatory drawing of the first embodiment.

After the material W is supported by the material table 39, the material table 39 and lifter table 31 are moved from the plate material taking-in/out area 11 to the material wait area 13 (see FIG. 8). Moreover, the slat conveyor 33 is switched from the open state to the blockade state. Then, the product pallet P2 is sent from the elevator 21 to the guide rails 17 by the pallet taking-in/out unit 23 (see FIG. 9).

In the case where a prescribed number of products WA are stored on the product pallet P2, the product pallet P2 is taken out from the guide rails 17 to the elevator 21 by the pallet taking-in/out unit 23, and the elevator 21 is raised to be positioned in a position whose level corresponds to a suitable storing section 5. The product pallet P2 is sent to the suitable storing section 5 by the pallet taking-in/out unit 23, and the elevator 21 is lowered to be positioned in a position whose level corresponds to the guide rails 17.

In the case where the material pallet P1 is emptied, as mentioned above, after the product pallet P2 is sent to the suitable storing section 5 and the elevator 21 is positioned in a position whose level corresponds to the guide rails 17, the emptied material pallet P1 is taken out from the guide rails 17 to the elevator 21 by the pallet taking-in/out unit 23, and the elevator 21 is raised to be in a position whose level corresponds to a suitable emptied storing section 5. Then, the emptied material pallet P1 is sent from the elevator 21 to the suitable emptied storing section 5 by the pallet taking-in/out unit 23, and the elevator 21 is lowered to a position whose level corresponds to the guide rails 17. Here, after the emptied material pallet P1 is sent to the storing section 5, the emptied material pallet P1 is managed as the product pallet P2.

According to the aforementioned embodiment of the present invention, since one of the materials W can be taken out from the material pallet P1 during the plate material processing to be supported by the material table 39, after the products WA which were subject to the plate material processing are stored on the product pallet P2, by moving the material table 39 from the material wait area 13 to the plate material taking-in/out area 11, the materials W can be supported on a plurality of the supporting rollers 35 on the slat conveyor 33 without moving the product pallet P2 from the plate material taking-in/out area 11 to the product wait area 15 and without moving the material pallet P1 from the material wait area 13 to the plate material taking-in/out area 11 by means of the lifter table 31. Therefore, the time for a sequence of the operations required for the materials W to be carried can be shortened, and thus an effect that the efficiency of the operation is improved is shown.

(Second Embodiment)

As for the second embodiment of the plate material carrying apparatus of the present invention, a laser processing machine is described as one example of plate material processing machines on reference to the drawings.

On reference to FIGS. 11 and 12, a laser processing machine 101 according to the present embodiment is composed mainly of a laser processing head 103 which irradiates a work W with a laser beam and simultaneously moves to the Y-axial direction on the sheets of FIGS. 11 and 12, a laser generator 105, an NC unit 107, a processing table 109 which is positioned below the laser processing head 103 and freely moves a pallet P to the X-axial direction, and a duct unit 111.

Figure 11:
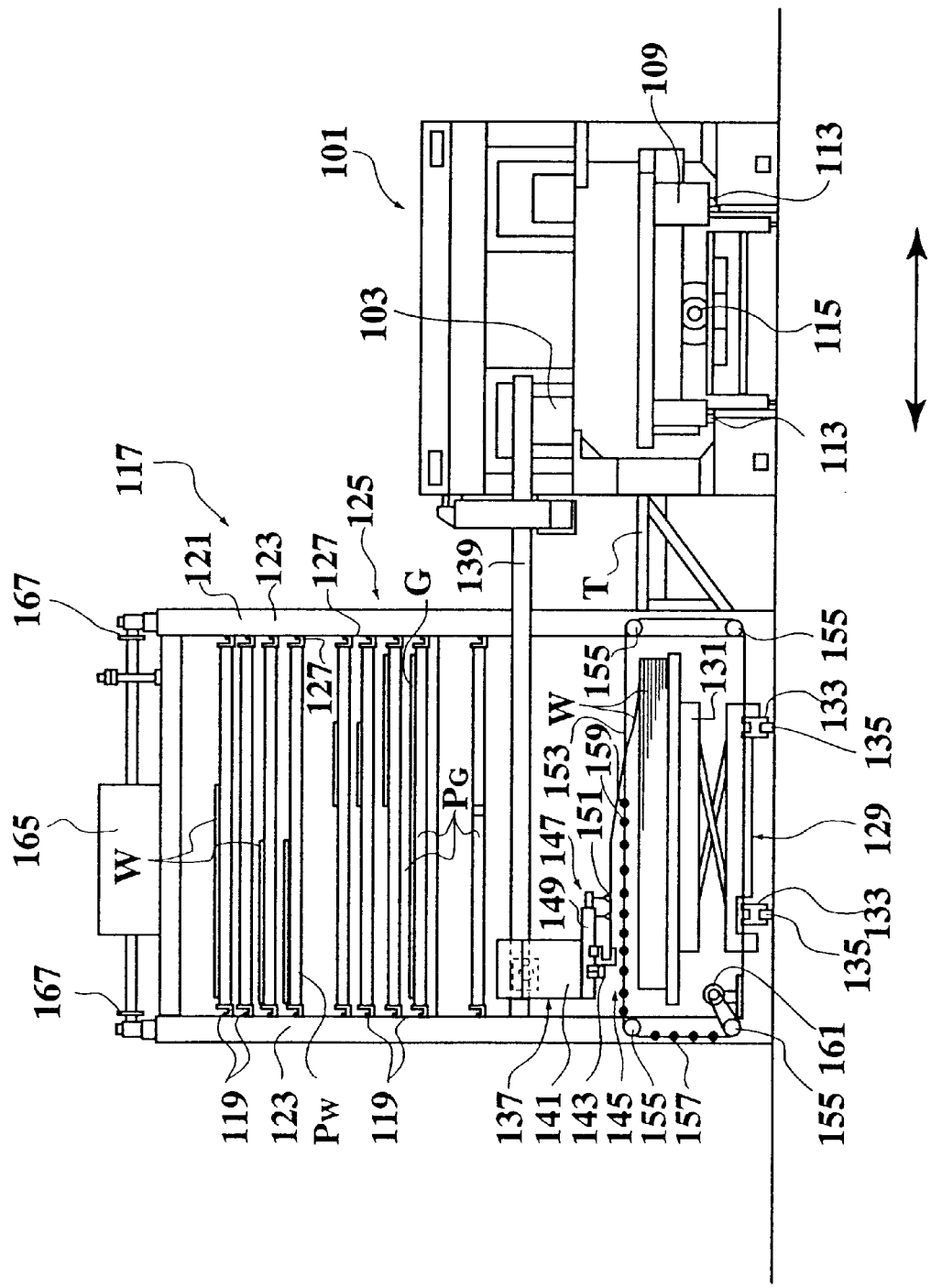
FIG. 11 is a front view showing the whole of the work carrying-in/out apparatus according to the second embodiment of the present invention.

When the processing table 109 is described in more detail on reference to FIG. 11, the processing table 109 travels on guide rails 113 to the X-axial direction (up-and-down direction in FIG. 12), and the movement of the processing table 109 is controlled by normal/reverse rotation of a ball screw 115 provided to the bottom surface of the processing table 109. Therefore, the pallet P placed on the processing table 109 moves to the X-axial direction by the movement of the processing table 109, and at the same time the laser processing head 103 moves to the Y-axial direction so that the laser processing is performed on the work W on the pallet P by the laser processing head 103.

Here, a positioning member (not shown) can be provided to the end portion of the processing table 109 in the Y-axial direction. In this case, the pallet P inserted in the Y-axial direction is positioned by engaging a positioning roller (not shown) provided to the end portion of the pallet P with the positioning member. A limit switch (not shown) can be provided to the positioning member so that the rotation of a motor (not shown) for moving the pallet P is stopped after the positioning.

Next, the description is given as to details of a work carrying-in/out apparatus 117 for carrying a work into a plate material processing machine 101 such as the above laser processing machine and carrying out a product G processed in the plate material processing machine 101.

Figure 12:
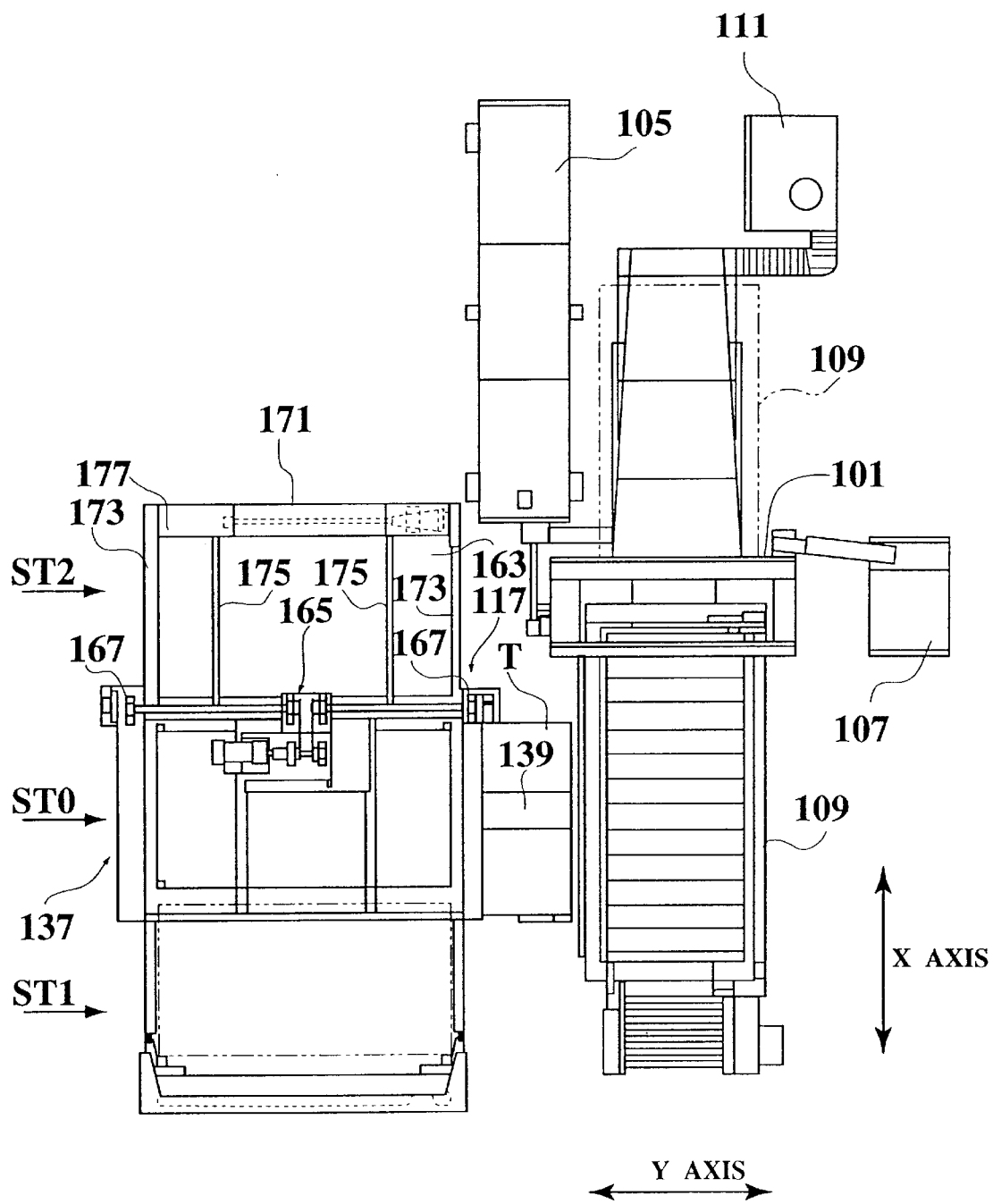
FIG. 12 is a plan view showing the whole of the work carrying-in/out apparatus according to the second embodiment of the present invention.

On reference to FIGS. 11 and 12, the work carrying-in/out apparatus 117 is placed to one side of the plate material processing machine 101. The work carrying-in/out apparatus 117 is provided with a work storage shelf 121 which has a plurality of pallet storing shelves 119 which form plural up-and-down steps. The pallet storing shelves 119 store a material pallet $P_w$ on which works to be carried into the plate material processing machine 101 are stored and store a plurality of product pallets $P_G$ on which products G processed in the plate material processing machine 101 are stored.

More specifically, a plurality of struts 123 made of channel materials, for example, are provided in a stand pose in the work storage shelf 121, and the respective struts 123 are connected with each other by a plurality of horizontal beam members so that a mount frame 125 is constituted.

Figure 10:
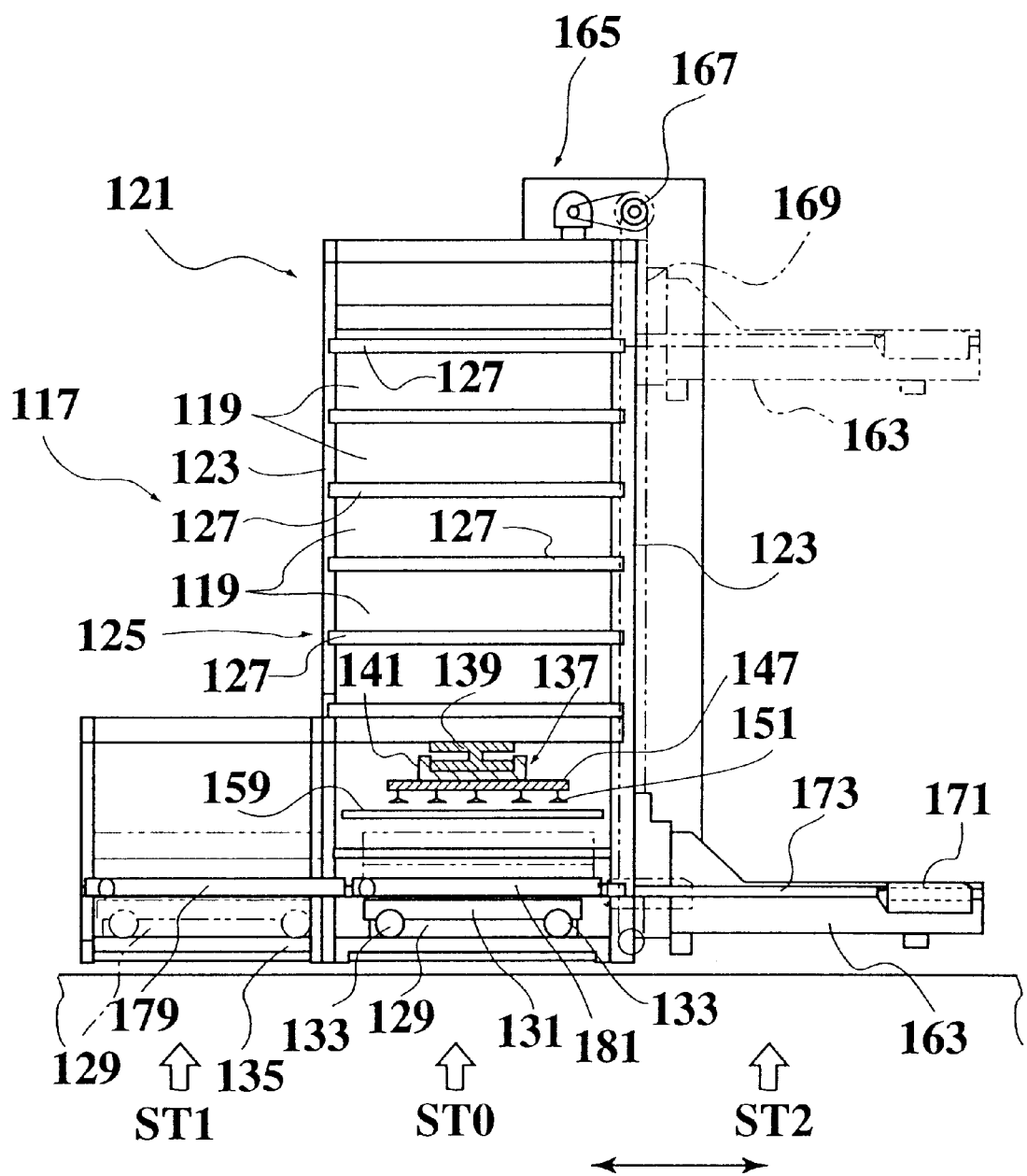
FIG. 10 is a side view showing the whole of a work carrying-in/out apparatus according to the second embodiment of the present invention.

In addition, as shown in FIGS. 10 and 11, guide rails 127 whose cross section is L-shaped are provided into the mount frame 125 to face each other on both sides so that the guide rails 127 guide and support a plurality of wheels provided to both the sides of the pallets. When a plurality of the guide rails 127 are provided in the up-and-down direction, the upper inside of the mount frame 125 is divided into a plurality of the pallet storing shelves 119 for storing the pallets therein.

In addition, the lower portion of the mount frame 125 is provided with a carrying-in/out station STO as an area where the works on the pallet are carried into the plate material processing machine 101, and the products G processed in the plate material processing machine 101 are carried out to be stored on the product pallets $P_G$.

More specifically, as shown in FIG. 10, a moving lifter unit 129 which supports the pallets, and moves up and down is provided in the taking-in/out station STO at the lower portion of the mount frame 125. The moving lifter unit 129 is constituted such that a supporting table 131 is supported horizontally by a pair of X-shaped links and the supporting table 131 is moved up and down by actuating the links through a hydraulic cylinder (not shown) similarly to the constitution of a general lifter unit.

Furthermore, as shown in FIG. 10, wheels 133 which are driven by a normal/reverse rotation motor (not shown) are provided to the lower portion of the moving lifter unit 129, and they can travel freely on a rail 135 which is extended on a floor between the carrying-in/out station STO and a first wait station ST1 adjacent to the carrying-in/out station STO to the right-and-left direction in FIG. 10.

A work carrying-in/out transport unit 137 is provided to the position above the moving lifter unit 129, and the work carrying-in/out transport unit 137 separates successively the works stored on the material pallet $P_W$ supported to the moving lifter unit 129 one by one to carry them into the plate material processing machine 101.

More specifically, as shown in FIGS. 10 and 11, a supporting beam 139 which is extended above the plate material processing machine 101 is provided horizontally to one inner side of the mount frame 125, and a transport loader 141 is provided to the supporting beam 139 so as to move to and fro freely. A motor (not shown) is mounted to the transport loader 141, and a pinion (not shown) which is rotated by the motor is engaged with a rack (not shown) provided to the supporting beam 139. Therefore, the transport loader 141 is moved to and from in the X-axial direction (right-and-left direction in FIG. 2) along the supporting beam 139 by rotating the motor normally and reversely.

As shown in FIG. 11, a clamp holder 143 which is extended to the Y-axial direction (right-and-left direction in FIG. 10) is supported to the lower portion of the transport loader 141 in an overhung manner, and a plurality of work clamps 145 for clamping the end portions of the works are mounted to the clamp holder 143.

Therefore, after the products G processed in the plate material processing machine 101 are clamped by the work clamps 145, when returned to the original position, the products G are carried out of the plate material processing machine 101 to the carrying-in/out station STO.

In addition, an adsorption unit 147 for adsorbing the vicinity of the end portion of the works is provided to the lower portion of the transport loader 141. The adsorption unit 147 is composed of a pad holder 149 fixed to the lower portion of the transport loader 141, and a plurality of adsorption pads 151 which are hung from the pad holder 149. Therefore, the vicinity of the end portion of the topmost work on the material pallet $P_W$ in the raised moving lifter unit 129 is adsorbed by the adsorption pads 151 to be separated from the other works.

A slat conveyor 153 is provided to the carrying-in/out station STO, and the slat conveyor 153 horizontally supports the work adsorbed by the adsorption unit 147 and carries this work to the plate material processing machine 101.

The slat conveyor 153 is constituted such that a pair of endless chain 157 is installed across a plurality of chain sprockets 155 which are supported to the mount frame 125 to be rotated freely, and a plurality of slat rollers. 159 are supported over a suitable extent of the chain 157 to be rotated freely. The chain 157 is driven by a motor 161 provided to a suitable position to travel.

According to the above constitution, one end portion of the work is adsorbed by the adsorption unit 147. Moreover, the chain 157 is traveled to the counterclockwise direction in FIG. 11 by driving of the motor 161, and a plurality of the slat rollers 159 are positioned to the upper side to be moved to the left direction in FIG. 11. As a result, the product G clamped by the work clamps 145 is supported horizontally by a plurality of the slat rollers 159.

When the product G processed in the plate material processing machine 101 is clamped by the work clamps 145 and are moved to the left direction in FIG. 11, the product G is supported by a plurality of the slat rollers 159. Then, in the state that one end portions of the product G is clamped by the work clamps 145, the chain 157 moves circularly to the counterclockwise direction in FIG. 11 so that a plurality of the slat rollers 159 are moved sideways. As a result, the upper part of the moving lifter unit 129 is opened, and thus the product G falls onto the pallet of the moving lifter unit 129 to be stored thereon.

A second wait station ST2, which is provided to one side of the Y-axial direction of the carrying-in/out station STO, is provided with an elevator unit 163 to move up and down freely so that a suitable pallet can be taken out of the pallet storing shelves 119 of the work storage shelf 121 to be transported onto the moving lifter unit 129 or so that a pallet on the moving lifter unit 129 is stored in the pallet storing shelf 119.

More specifically, the elevator unit 163 is guided to a vertical guide rail (not shown) provided to the struts 123 of the mount frame 125 to be moved up and down, and the elevator unit 163 is connected to a chain 169 which is hung across sprockets 167 in a winch unit 165 mounted to the upper part of the mount frame 125 and which moves up and down.

According to the above constitution, the elevator unit 163 is suitably moved up and down by the driving of the winch unit 165, and the elevator unit 163 is positioned in a position whose level corresponds to the pallet storing shelves 119 and in a position whose level is suitable for sending the pallets to the moving lifter unit 129.

A pallet transport unit 171 such as a traverser is provided to the elevator unit 163 so as to freely move to and from in the right-and-left direction in FIG. 10, and this pallet transport unit 171 sends and pulls the pallets to and into the pallet storing shelves and the moving lifter unit 129.

More specifically, the elevator unit 163 is provided with a pair of guide rails 173 horizontally in a position whose width is the same as a plurality of the guide rails 127 of the pallet storing shelves 119 in order to support the pallets. Further, the elevator unit 163 is provided with a pair of guide rails 175 horizontally for guiding the pallet transport unit 171. The pallet transport unit 171 is provided with a hook 177 which can be engaged with and detached from engaging projections provided to the end portions of the pallets.

According to the above constitution, when the hook 177 is engaged with the engaging projections of the pallets, and the pallet transport unit 171 is moved to the right-and-left direction in FIG. 10, the pallets are sent to and pulled out of the pallet storing shelves 119 and the carrying-in/out station STO.

The first wait station ST1 is provided to the other side of the carrying-in/out station STO, and as shown in FIG. 10, a guide rail 179 whose cross section is L-shaped is provided to the inside of the mount frame 125 in the first wait station ST1 in the right-and-left in order to guide and supports a plurality of wheels provided to the right and left sides of the pallets, and a guide rail 181 is provided to the carrying-in/out station STO.

Therefore, when a pallet is sent from the elevator unit 163 to the guide rail 181 in the carrying-in/out station STO, the pallet which has been supported to the carrying-in/out station STO is transported by the moving lifter unit 129 and is evacuated in the first wait station ST1 temporarily.

According to the aforementioned constitution, the elevator unit 163 is first raised to a position whose level is the same as the suitable pallet storing shelf 119, and draws out the material pallet $P_W$ on which unprocessed works are stored from the pallet storing shelf 119 and the elevator unit 163 is lowered to the lowest position. When the elevator unit 163 is in the lowest position, as shown in FIG. 13A, the level of the guide rails 173 in the elevator unit 163 coincides with the level of the guide rail 181 in the carrying-in/out station STO.

Therefore, when the supporting table 131 of the moving lifter unit 129 is lowered more than the guide rail 181, the material pallet $P_W$ can be sent from the elevator unit 163 onto the guide rail 181.

Figure 13A:
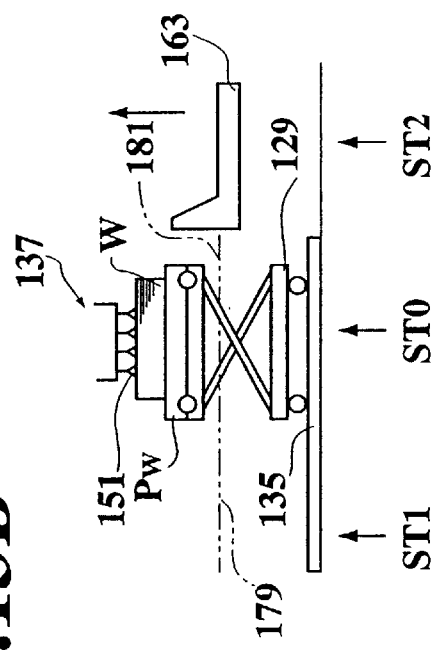
FIGS. 13A through 13G are operation explanatory drawing showing an operation of the work carrying-in/out apparatus according to embodiments of the present invention.

As shown in FIG. 13A, when the material pallet $P_W$ is sent onto the guide rail 181, the elevator unit 163 is raised to be positioned in a position whose level corresponds to an arbitrary pallet storing shelf 119, and an emptied pallet is drawn out of the pallet storing shelf 119 as a product pallet $P_G$, and as mentioned above, the product pallet $P_G$ is lowered to a level where the guide rails 173 in the elevator unit 163 coincides with the guide rail 181 in the carrying-in/out station STO, and the pallet waits in this level.

Figure 13B:
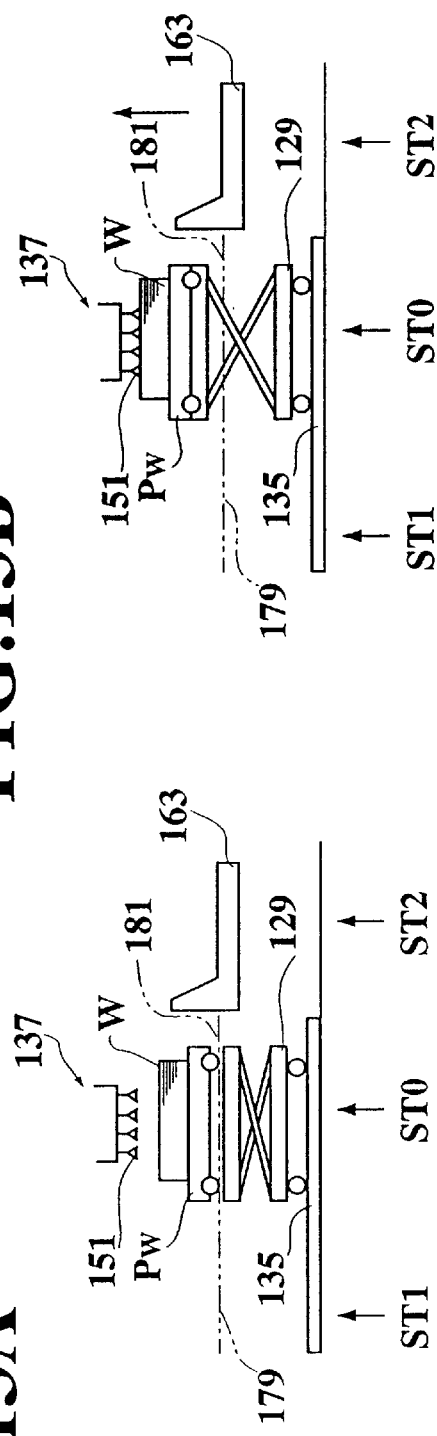

During this, as shown in FIG. 13B, the moving lifter unit 129 is raised in the carrying-in/out station STO, and the material pallet $P_W$ is pushed up so that the topmost work on the material pallet $P_W$ is brought into contact with the adsorption pads 151 of the adsorption unit 147.

Figure 13C:
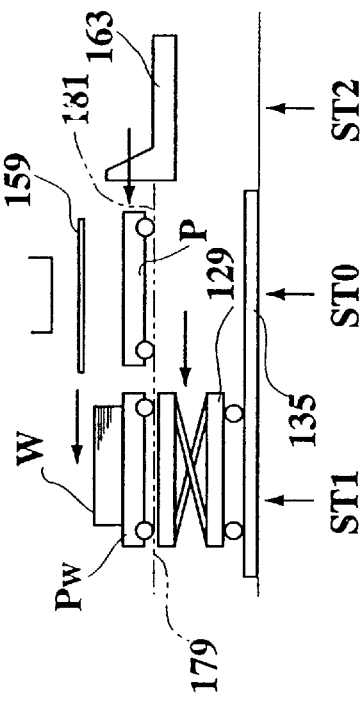

After one end of the topmost work W on the material pallet $P_W$ is adsorbed by the adsorption pads 151, when the moving lifter unit 129 is lowered, the end portion of the topmost work W is separated from the other works W. Thereafter, as shown in FIG. 13C, a plurality of the slat rollers 159 of the slat conveyor 153 are moved to the upper side, and the topmost work is supported substantially horizontally by the slat rollers 159.

The work is supported horizontally by the slat conveyor 153. Thereafter, when only the work carrying-in/out transport unit 137 is moved, the work W adsorbed by the adsorption pads 151 is carried onto the processing table 109 of the plate material processing machine 101.

The work W carried onto the processing table 109 moves to the X-axial direction and the laser processing head 103 is moved to the Y-axial direction by the moving of the processing table 109, and the work W is laser-processed by the laser processing head 103.

As mentioned above, after the work W is carried into the plate material processing machine 101, the work carrying-in/out transport unit 137 waits in a position of an intermediate table T (FIGS. 11 and 12) provided between the plate material processing machine 101 and the work carrying-in/out unit 117.

Figure 13D:
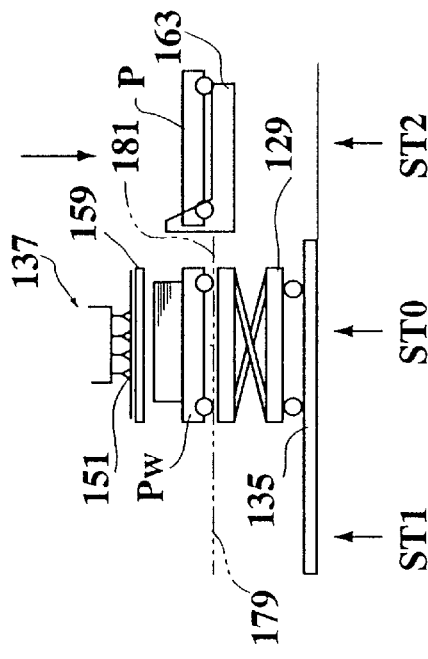

In addition, as mentioned above, while the work W is being processed in the plate material processing machine 101, as shown in FIG. 13D, the moving lifter unit 129 in the carrying-in/out station STO is raised so as to lift the material pallet $P_W$ slightly from the guide rail 181, and the moving lifter unit 129 travels to the left direction in FIG. 10. As a result, the material pallet $P_W$ is moved from the carrying-in/out station STO to the first wait station ST1. When the moving lifter unit 29 is lowered, the material pallet $P_W$ is placed on the guide rail 179 in the first wait station ST1 and waits thereon.

Figure 13E:
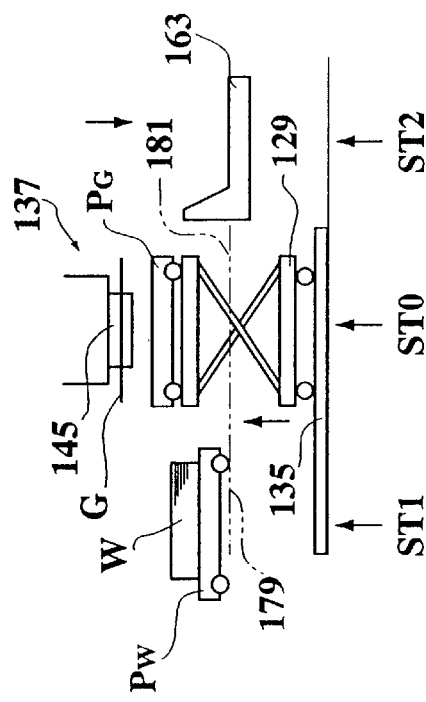

As mentioned above, after the material pallet $P_W$ is moved from the carrying-in/out station STO to the first wait station ST1, as shown in FIG. 13E, an emptied product pallet $P_G$ is sent by the pallet transport unit 171 from the elevator unit 163 onto the guide rail 181 in the carrying-in/out station STO.

When the processing of the work W is completed in the plate material processing machine 101, the work carrying-in/out transport unit 137 in the wait state is moved towards the plate material processing machine 101, and after one end of the product G is clamped by the work clamps 145, the product G is carried out of the plate material processing machine 101.

Figure 13F:
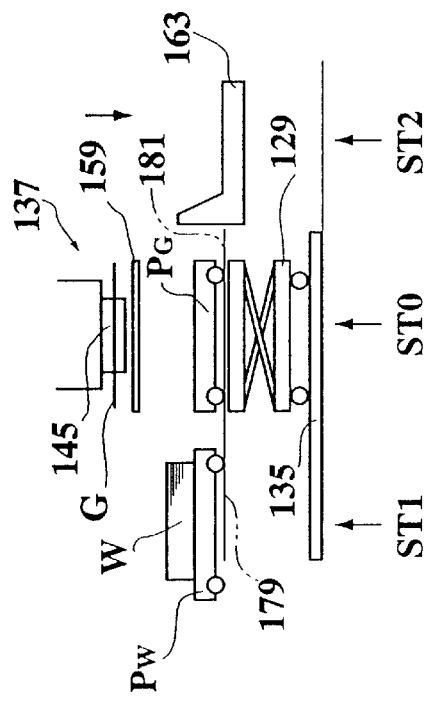

When the work clamps 145 of the work carrying-in/out transport unit 137 hold the product G and are returned to the original position, the product G is supported horizontally by a plurality of the slat rollers 159 of the slat conveyor 153 above the product pallet $P_G$. At this time, as shown in FIG. 13F, the moving lifter 129 is returned to the carrying-in/out station STO and raises the product pallet $P_G$ so that the product pallet $P_G$ approaches near the slat rollers 159. Thereafter, a plurality of slat rollers 159 are moved sideways and the upper part of the product pallet $P_G$ is opened, and at the same time clamping by the work clamp 145 is released. As a result, the product G falls onto the product pallet $P_G$ and is placed thereon.

Figure 13G:
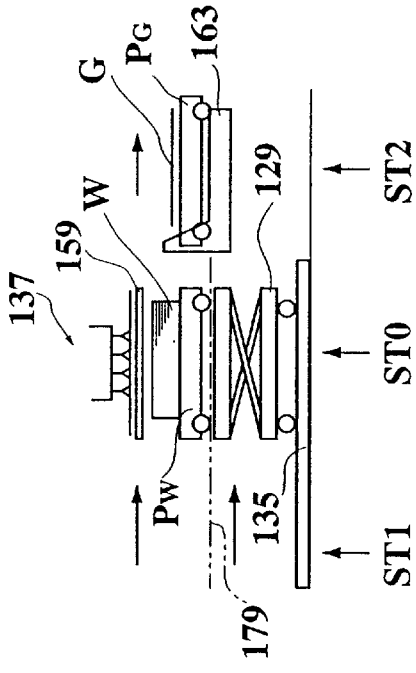

Thereafter, as shown in FIG. 13G, the product pallet $P_G$ is pulled back by the pallet transport unit 171 of the elevator unit 163 from the guide rail 181 in the carrying-in/out station STO to the guide rails 173 of the elevator unit 163, and the product pallet $P_G$ waits in the elevator unit 163, namely, in the second wait station ST2.

After the product pallet $P_G$ is pulled back from the carrying-in/out station STO to the second wait station ST2 of the elevator unit 163, the moving lifter unit 129 moves again from the carrying-in/out station STO to the first wait station ST1, and the moving lifter unit 129 is raised in the first wait station ST1 to slightly lift the material pallet $P_W$ from the guide rail 179. Then, when the moving lifter unit 129 travels to the right direction in FIGS. 10 and 13G, the material pallet $P_W$ is moved from the first wait station ST1 to the carrying-in/out station STO.

The moving lifter unit 129 is again raised in the carrying-in/out station STO, and as shown in FIG. 13B, the material pallet $P_W$ is pushed up so that the topmost work W on the material pallet $P_W$ is brought into contact with the adsorption pads 151 of the adsorption unit 147. One end of the topmost work W on the material pallet $P_W$ is adsorbed by the adsorption pads 151, and the moving lifter unit 129 is lowered and one work W is separated to be carried into the plate material processing machine 1 by the work carrying-in/out transport unit 137 and is processed therein.

The above steps are repeated until the works W on the material pallet $P_W$ are processed, and after all the products G are placed on the product pallets $P_G$, the product pallets $P_G$ are transported to the elevator unit 163, and the elevator unit 163 is raised so that the product pallets $P_G$ are stored in the pallet storing shelves 119.

Meanwhile, the emptied material pallet $P_W$ waits in the first wait station ST1 and may be used as a next product pallet $P_G$. In this case, the material pallet $P_W$ waits in the elevator unit 163 positioned in the second wait station ST2, and the carrying of the work W into the plate material processing machine 1 and the carrying-out of the product G processed by the plate material processing machine 101 are performed alternately.

In another method, the emptied material pallet $P_W$ is transported to the elevator unit 163 and the material pallet $P_W$ may be stored in the pallet storing shelf 119 by the elevator unit 163.

As mentioned above, according to the present embodiment, the first wait station ST1 and second wait station ST2 are provided to the position adjacent to the carrying-in/out station STO having the work carrying-in/out transport unit 137, and the moving lifter unit 129 which can lift and lower the pallets in the stations is provided between at least one wait station and the carrying-in/out station STO so as to freely move to and fro between the stations. However, in another embodiment, a plurality of wait stations are provided for the carrying-in/out station STO, and the moving lifter unit 129 can be provided between at least one wait station and the carrying-in/out station STO.

Here, the present invention is not limited to the aforementioned embodiments, so it can be exploited in another embodiments by making suitable changes. In the present embodiments, the description is given as for the plate material processing machine by exemplifying a laser processing machine, but the present invention may be applied to a punching press and another plate material processing machines.

What is claimed is:

1. A workpiece carrying-in/out apparatus for carrying workpieces into and out from a plate material processing machine which processes plate-shaped workpieces, said apparatus comprising:
   a mount frame including a plurality of pallet storing sections and a plate material taking in/out area;
   a first wait station provided on one side of said mount frame;
   a second wait station provided on the other side of said mount frame;
   a moving lifter table moving a material pallet or a product pallet up and down in the mount frame so as to carry workpieces into the plate material processing machine and carry out workpieces processed by the plate material processing machine, said moving lifter table being movable when in a lowered position between said first wait station and said plate material taking in/out area so as to have the material pallet or the product pallet waiting and supporting the workpieces;
   a workpiece carrying-in/out transport unit separating the workpieces on the material pallet in the mount frame one by one so as to carry the workpieces into the plate material processing machine and carrying the workpieces processed by the plate material processing machine to the product pallet positioned in the mount frame; and
   a material table having a support surface movable between said first wait station and said plate material taking in/out area such that the support surface temporarily supporting the material pallet or product pallet in either the mount frame or first wait station, whereby said material table is movable in the plate material taking in/out area when the moving lifter table is in its lowered position.

2. The workpiece transfer apparatus for a plate material processing machine according to claim 1, wherein said second wait station comprises an elevator unit being able to freely move up and down and transporting the product pallet or material pallet to said moving lifter table and the pallet storing sections in said transfer station.

* * * * *